July 18, 1933.   E. L. HUGHES   1,919,162
MACHINE FOR FORMING HOLLOW GLASSWARE
Filed March 21, 1932   2 Sheets-Sheet 2
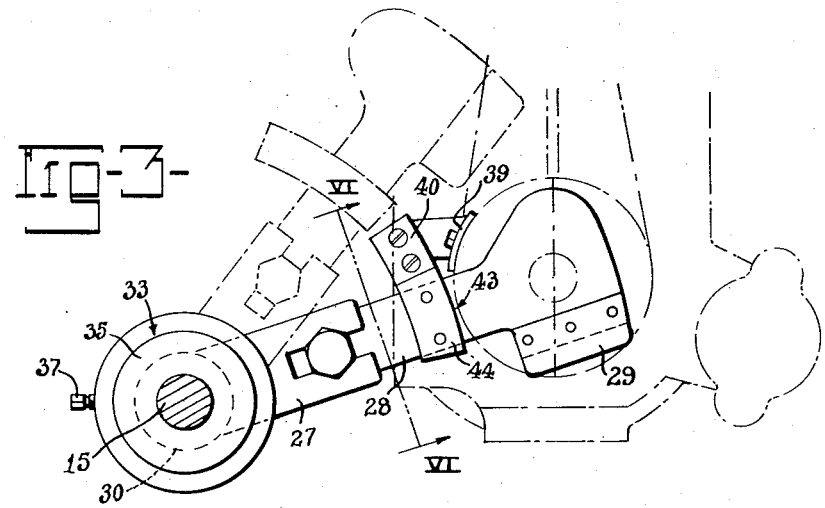
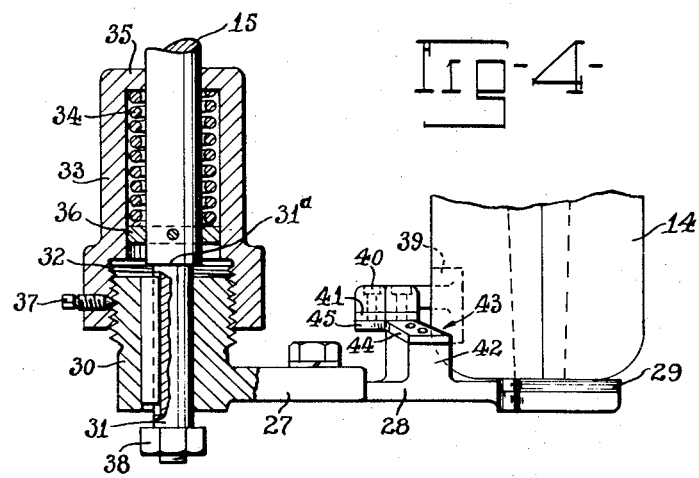
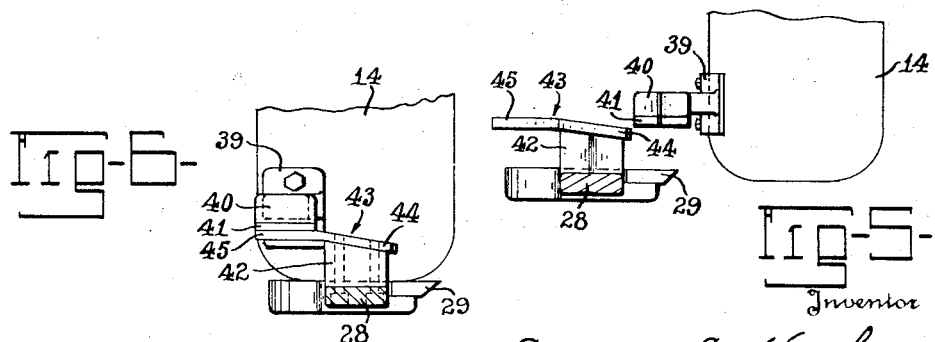
Inventor
Edward L. Hughes
By J. F. Rule
Attorney Patented July 18, 1933

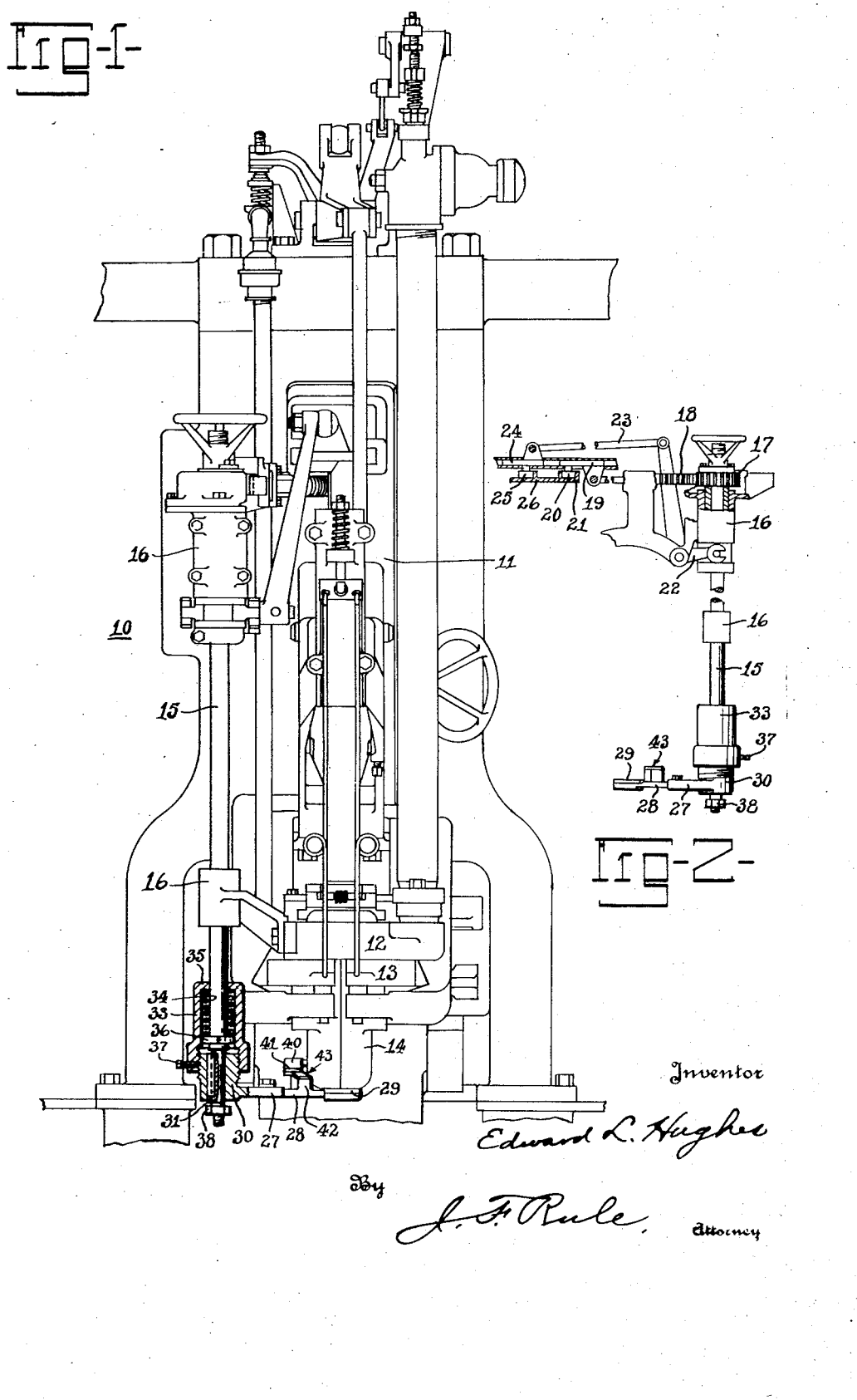

1,919,162

UNITED STATES PATENT OFFICE

EDWARD L. HUGHES, OF TOLEDO, OHIO, ASSIGNOR TO OWENS-ILLINOIS GLASS COMPANY, A CORPORATION OF OHIO

MACHINE FOR FORMING HOLLOW GLASSWARE

Application filed March 21, 1932. Serial No. 600,185.

The present invention relates to improvements in machines for forming hollow glassware and more particularly to mechanism for severing gathered mold charges of molten glass from the main supply body.

In certain types of machines constructed to gather mold charges by suction from a supply body, the blank molds which constitute the gathering molds have their charging openings facing downwardly. These molds are brought one at a time into sealing contact with an exposed gathering area of molten glass and the air is exhausted from the mold cavities and replaced by a measured quantity of molten glass. The charging or blank mold is then lifted away from the supply body and a cut-off knife individual thereto is swung across the lower end of the mold to sever the mold charge from the supply body. The charge severing mechanism ordinarily includes a vertical rock shaft extending parallel with the mold and carrying at its lower end a knife which, due to oscillation of the shaft, is moved back and forth across the lower end of the mold. Extremely accurate adjustment of the knife is necessary in order to sever the mold charges reasonably close to the lower ends of the molds and at the same time avoid contact between the cutting edge of the knife and any portion of the mold body. Obviously too great a clearance will result in highly unsatisfactory conditions being set up such for example, as a rough cut-off and a tendency to pull a portion of the charge of glass out of the mold cavity. Too high an adjustment of the knife will result in the knife striking one side of the mold. It is apparent that operation under these conditions will not only dull the knife in a short period of time but in addition will tend to chip away portions of the mold. Uncertain and varied degrees of expansion and contraction of the molds and other conditions more or less beyond the operator's control result in inaccurate relative positioning of the cut-off knives and molds at the time of severance of the mold charges.

An object of the present invention is the provision of manually adjustable means which will operate automatically to insure absolute accurate alignment of the cut-off knife and mold during each and every cutting operation irrespective of contraction or expansion of the molds and whether or not the mold always comes out of dip to a constant level. To this end the knife and its holder are supported for limited up and down movement on the lower end of the usual rock shaft, there being provided means for yieldingly supporting the holder and knife above the normal cutting plane and cooperating pilots or the like on the mold and holder for bringing the knife to the proper cutting level just in advance of its movement beneath the mold.

Other objects will be in part apparent and in part pointed out hereinafter.

In the drawings:

Fig. 1 is a fragmentary front elevational view of a conventional mold group showing partly in section one embodiment of the present invention.

Fig. 2 is a fragmentary side elevational view with parts in section illustrating the oscillating and raising and lowering means for the knife.

Fig. 3 is a sectional plan view illustrating two successive positions of the cut-off knife relative to a blank mold.

Fig. 4 is a detail sectional elevational view.

Fig. 5 is a sectional elevational view showing the relative positions of the knife and mold just prior to the actual cutting operation.

Fig. 6 is a view similar to Fig. 5 taken along the line VI—VI of Fig. 3, showing the relative positions of the knife and mold upon completion of the charge severing operation.

The present inventon is illustrated as embodied in a mold group constructed and adapted to be operated in accordance with the disclosure in LaFrance Patent 1,185,687, dated June 6, 1916, to which reference may be had for details not fully disclosed herein.

In more or less general terms the mold group includes a blank mold unit 10 consisting of a dipping frame 11, a dipping head 12, and a partible neck and body blank molds 13 and 14 respectively, mounted on the lower side of said dipping head. This dipping frame 11 together with the molds carried thereby move up and down at regular time intervals as a part of the mold charging operation.

The charge severing or cut-off mechanism which separates gathered mold charges from the supply body of glass (not shown) is mounted upon the dipping frame in the usual manner as disclosed in the LaFrance patent above identified. This mechanism may consist of a vertical rock shaft 15 journaled in bearings 16 which are suitably connected to the dipping frame 11. The knife and parts directly associated therewith and comprising the present invention are mounted upon the lower end of the rock shaft as will be brought out presently. The upper end of the rock shaft is connected to a conventional or any preferred form of adjusting means whereby the cutting level of the knife may be varied as required by molds of different lengths.

The rock shaft is adapted to be oscillated and reciprocated during each cycle of operations. Oscillation of the shaft is obtained by means of a pinion 17 on the upper end of said shaft meshing with a rack bar 18 which is connected to a slide 19, the latter carrying a cam roll 20 running in a cam 21. The cam is shaped to reciprocate the rack bar at regular time intervals and thereby oscillate the shaft. Reciprocation of the rock shaft 15 is obtained by mechanism including a bell crank lever 22 suitably connected to the upper portion of the rock shaft and through a rod 23 to a slide 24, said slide carrying a cam roll 25 engaging a stationary cam 26. This cam 26 is of such shape that it operates through the bell crank lever 22 to lower the knife away from the mold shortly after the charge severing operation and later raises the knife to the level occupied prior to its cutting stroke. The above construction and operation are in accordance with the teaching in the above identified patent.

A rock arm 27 is mounted at the lower end of the rock shaft 15 and has removably secured thereto a knife holder 28 on which the cutter 29 or knife is carried. The rock arm 27 extends radially from a collar 30 (Fig. 4) which is keyed to the reduced lower end 31 of the rock shaft. A shoulder 31$^a$ at the upper end of the reduced portion forms a stop against which the collar normally bears under spring pressure. This collar 30 is externally screw threaded for engagement with internal threads 32 on a spring casing 33 or housing within which a coil spring 34 is arranged. This coil spring encircles the lower portion of the rock shaft 15 and is confined between the upper end wall 35 of the casing 33 and a retaining ring 36 which is pinned or otherwise rigidly connected to the shaft. This spring yieldingly supports the rock arm 27 and parts directly connected thereto in their uppermost position on the rock shaft causing engagement between the collar 30 and shoulder 31$^a$. A set screw 37 is employed to prevent premature relative rotation between the collar 30 on the rock arm and the casing 33. A nut 38 is threaded on the lower end of the rock shaft 15 merely as a precautionary measure to insure against separation of the rock arm 27 and rock shaft 15. The rock shaft 15 under normal operating conditions will be adjusted so that the knife 29 while in its inoperative position is disposed in a horizontal plane a short distance above the plane in which it performs the actual cutting operation. This insures against the knife being spaced too far below the mold at the time it severs the mold charges from the supply body of glass. In order to move the knife downwardly to the exact level necessary for the cutting operation, the present invention provides a pair of cooperating pilots on the blank mold 14 and knife holder 28. The pilot on the blank mold consists of an attaching plate 39 secured to one of the mold sections and carrying an arm 40 to the lower side of which is fixed a hardened bearing plate 41, said plate and arm being disposed in a horizontal plane and extending substantially in the direction of the cut-off mechanism. The pilot on the knife holder 28 consists of an upstanding arm 42 provided inwardly from the outer end of the holder and carrying at its upper end a cam 43 which engages the hardened plate 41 just in advance of, during, and for a period of time following the cutting operation. This cam 43 includes an inclined surface 44, the upper end of which merges into a horizontal portion 45.

In operation, it will be assumed that the rock shaft 15 and spring casing 33 are adjusted to yieldingly support the knife 29 substantially in the plane indicated in Fig. 5 in which it is a short distance above the upper end of the mold. Also, this adjustment is such that the lower end of the inclined portion 44 of said cam 43 is slightly below the hardened plate 41 on the pilot carried by the mold to insure proper engagement between the two pilots. With movement of the shaft to swing the knife across the lower end of the mold, said pilots are brought into engagement with each other. Immediately, the knife is lowered sufficiently to clear the mold just the distance necessary to obtain a satisfactory severing operation. Then following compacting of this glass in the mold and against the knife (an ordinary operation) the rock shaft is lowered and rotated to return the knife to its inoperative position. Such accurate positioning of the knife is assured regardless of variation in the length of molds due to expansion or contraction and whether or not the molds come "out of dip" to a constant level. The tension of the spring 34 may be regulated to insure engagement between the collar 30 and shoulder 31$^a$ merely by relative rotation of the spring housing 33 and collar 30.

Modifications may be resorted to within the spirit and scope of the appended claims.

What I claim is:

1. In combination, a blank mold having a charging opening at one end, charge severing mechanism including a knife mounted for oscillation in a plane at right angles to the axis of the mold, mechanism for oscillating the knife, yielding means normally supporting the knife out of alignment with a predetermined cutting plane, and means comprising a guide on the mold operating automatically to move the knife into said cutting plane as it approaches the mold during the cutting stroke.

2. In combination, a blank mold having a charging opening at one end, charge severing mechanism including a knife mounted for oscillation in a plane at right angles to the axis of the mold, mechanism for oscillating the knife, yielding means normally supporting the knife out of alignment with a predetermined cutting plane, and means including a pair of cooperating pilots on the blank mold and knife for moving the knife into said cutting plane as it approaches the mold during the cutting stroke.

3. In combination, a blank mold having a downwardly facing charging opening, charge severing mechanism including a vertical rock shaft arranged alongside the mold, a knife holder mounted for limited vertical movement on the lower end of the shaft, a knife on the holder, yielding means normally supporting said holder in a plane above a predetermined cutting plane, means for rocking the shaft to swing the knife across the lower end of the mold, and means operable prior to movement of the knife beneath the mold to lower the knife and holder to said cutting plane.

4. In combination, a blank mold having a downwardly facing charging opening, charge severing mechanism including a vertical rock shaft arranged alongside the mold, a knife holder mounted for limited vertical movement on the lower end of the shaft, a knife on the holder, yielding means normally supporting said holder in a plane above its normal cutting plane, means for rocking the shaft to swing the knife across the lower end of the mold, and a pair of cooperating pilots on the mold and knife holder operable to lower the knife and holder to said normal cutting plane just in advance of movement of the knife beneath the mold.

5. In combination, a blank mold having a downwardly facing charging opening, charge severing mechanism including a vertical rock shaft arranged alongside the mold, a knife holder mounted for limited vertical movement on the lower end of the shaft, a knife on the holder, yielding means normally supporting said holder in a plane above its normal cutting plane, means for rocking the shaft to swing the knife across the lower end of the mold, a pair of cooperating pilots on the mold and knife holder operable to lower the knife and holder to said normal cutting plane just in advance of movement of the knife beneath the mold, said pilots including an arm extending laterally from the mold, and a cam supported on the holder for engagement with said arm.

6. In combination, a blank mold having a downwardly facing charging opening, charge severing mechanism including a vertical rock shaft arranged alongside the mold, a rock arm mounted for limited vertical movement on the lower end of said shaft and fixed against rotation thereon, a knife supported on the rock arm for movement across the bottom of the mold, means for oscillating the shaft to thereby periodically move said knife, yielding means normally holding the rock arm in its uppermost position relative to the shaft, and means in part carried by the mold for lowering the holder in opposition to said yielding means, thereby placing the knife in a predetermined cutting plane prior to movement of the knife beneath the mold.

7. In combination, a blank mold having a downwardly facing charging opening, charge severing mechanism including a vertical rock shaft arranged alongside the mold, a rock arm mounted for limited vertical movement on the lower end of said shaft and fixed against rotation thereon, a knife supported on the rock arm for movement across the bottom of the mold, means for oscillating the shaft to thereby periodically move said knife, a coil spring encircling the rock shaft above the rock arm, means connecting the rock arm and spring whereby the latter normally supports the holder in its uppermost position on the shaft, and means carried by the mold for lowering the knife in opposition to the spring tension to a predetermined cutting plane in advance of movement of the knife beneath the mold.

8. In combination, a blank mold having a downwardly facing charging opening, charge severing mechanism including a vertical rock shaft arranged alongside the mold, a rock arm mounted for limited vertical movement on the lower end of said shaft and fixed against rotation thereon, a knife supported on the rock arm for movement across the bottom of the mold, means for oscillating the shaft to thereby periodically move said knife, a coil spring encircling the rock shaft above the rock arm, a collar fixed to the shaft and supporting the spring, a casing enclosing the spring and collar, means adjustably connecting the casing and rock arm whereby the tension of the spring may be varied, said spring yieldingly supporting the knife in its uppermost position relative to the shaft, and means operable prior to movement of the knife beneath the mold to lower the knife and holder on the shaft in opposition to the spring.

9. In combination, a blank mold having a downwardly facing charging opening, charge severing mechanism including a vertical rock shaft arranged alongside the mold, a rock arm mounted for limited vertical movement on the lower end of said shaft and fixed against rotation thereon, a knife supported on the rock arm for movement across the bottom of the mold, means for oscillating the shaft to thereby periodically move said knife, a coil spring encircling the rock shaft above the rock arm, a collar fixed to the shaft and supporting the spring, a casing enclosing the spring and collar, means adjustably connecting the casing and rock arm whereby the tension of the spring may be varied, said spring yieldingly supporting the knife in its uppermost position relative to the shaft, and means operable prior to movement of the knife beneath the mold to lower the knife and holder on the shaft in opposition to the spring, the last named means including cooperating pilots on the mold and knife.

10. In combination, a blank mold having a downwardly facing charging opening, charge severing mechanism including a vertical rock shaft arranged alongside the mold, a rock arm mounted for limited vertical movement on the lower end of said shaft and fixed against rotation thereon, a knife supported on the rock arm for movement across the bottom of the mold, means for oscillating the shaft to thereby periodically move said knife, a coil spring encircling the rock shaft above the rock arm, a collar fixed to the shaft and supporting the spring, a casing enclosing the spring and collar, means adjustably connecting the casing and rock arm whereby the tension of the spring may be varied, said spring yieldingly supporting the knife in its uppermost position relative to the shaft, and means operable prior to movement of the knife beneath the mold to lower the knife and holder on the shaft in opposition to the spring including a pilot on the mold in proximity to the charging opening and a pilot on the knife having a cam surface for engagement with the other pilot.

11. In combination, a blank mold having a downwardly facing charging opening, charge severing mechanism including a vertical rock shaft arranged alongside the mold, a rock arm mounted for limited vertical movement on the lower end of said shaft and fixed against rotation thereon, a knife supported on the rock arm for movement across the bottom of the mold, means for oscillating the shaft to thereby periodically move said knife, a coil spring encircling the rock shaft above the rock arm, a collar fixed to the shaft and supporting the spring, a casing enclosing the spring and collar, means adjustably connecting the casing and rock arm whereby the tension of the spring may be varied, said spring yieldingly supporting the knife in its uppermost position relative to the shaft, means operable prior to movement of the knife beneath the mold to lower the knife and holder on the shaft in opposition to the spring including an arm extending laterally from the mold in proximity to the charging opening, and a pilot movable with the knife and including an inclined surface adapted for engagement with said arm to lower the knife.

12. In combination, a blank mold having a downwardly facing charging opening, charge severing mechanism including a vertical rock shaft arranged alongside the mold, said shaft having a diametrically reduced lower end providing a downwardly facing shoulder at the upper end of the reduced portion, a rock arm keyed to said reduced portion and mounted for up and down movement thereon, a knife and knife holder on said rock arm, spring means yieldingly supporting the knife holder in its uppermost position on the shaft and in contact with said shoulder, means for imparting rotary movement to the shaft to thereby swing the knife across the bottom of the mold, and means carried by the mold and knife holder for lowering the rock arm, knife holder, and knife, away from said holder to a predetermined cutting plane prior to movement across the lower end of the mold.

EDWARD L. HUGHES.